Oct. 8, 1963  F. L. WAITE  3,106,235
BREAD SLICING MACHINE
Filed June 7, 1960  5 Sheets-Sheet 1

INVENTOR.
FRED L. WAITE
BY
ATTORNEY

INVENTOR.
FRED L. WAITE

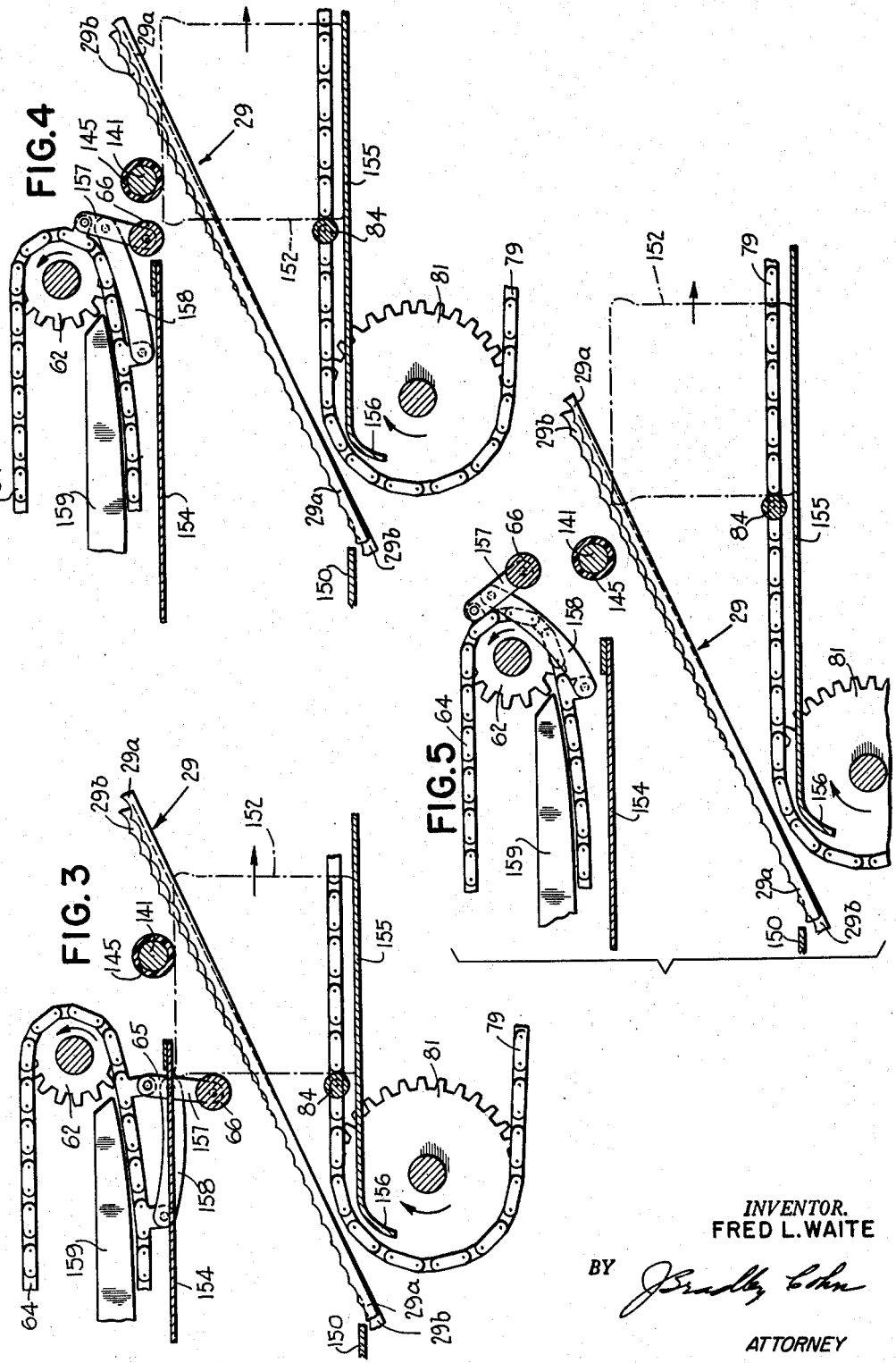

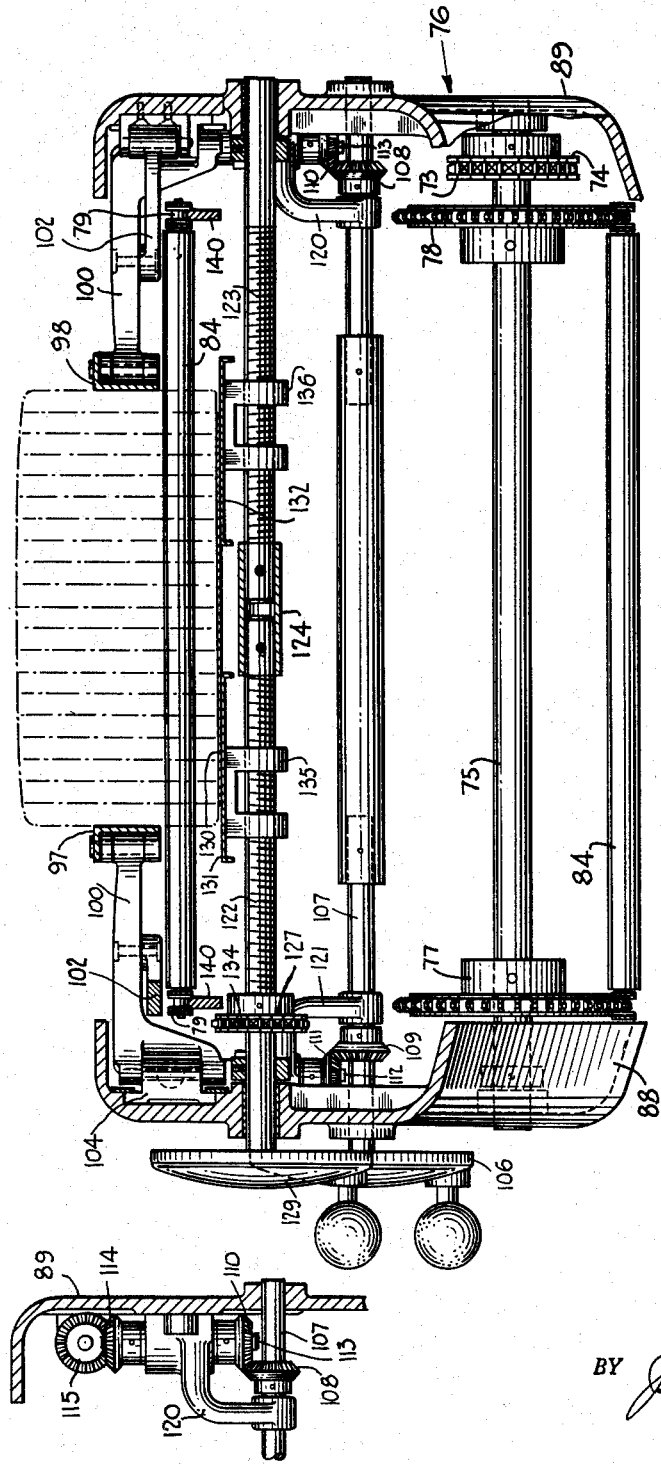

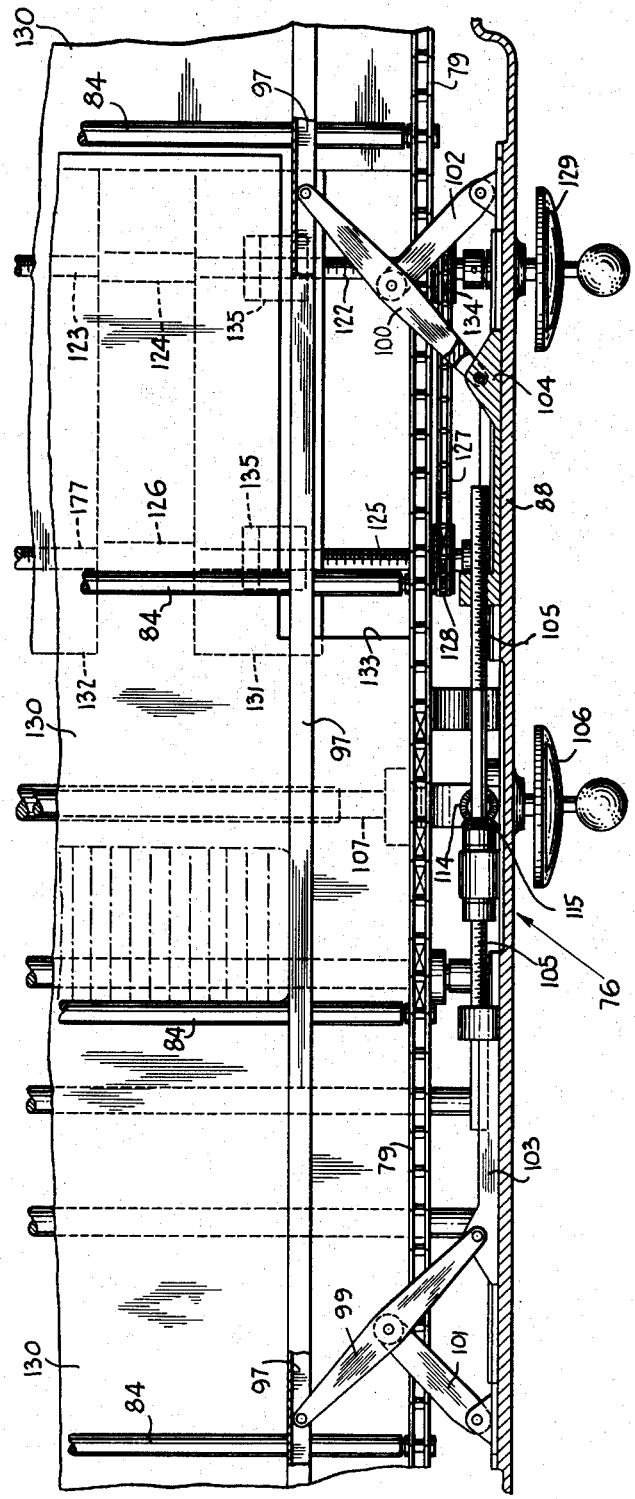

United States Patent Office 3,106,235
Patented Oct. 8, 1963

3,106,235
BREAD SLICING MACHINE
Fred L. Waite, East Williston, N.Y., assignor to American Machine & Foundry Company, a corporation of New Jersey
Filed June 7, 1960, Ser. No. 34,551
6 Claims. (Cl. 146—88)

This invention relates in general to slicing machines and more particularly to high speed bread slicing machines using endless bandsaw blades.

An object of this invention is to provide positive contact and support for a loaf of bread at all times while it is passing through the blades of a bread slicing machine. The provision of positive contact with each loaf while it is being cut is a particularly valuable feature of this invention in that the soft modern breads, which are still hot and spongy after emerging from the cooler, will tend to deform while in contact with slicing blades. This deformation results in wavy cuts when the sliced loaf springs back to its original shape. Positive contact with the back of each loaf tends to minimize such distortion.

Another object of this invention is to provide a bread slicing machine through which a loaf may be moved at a higher velocity so that the overall speed of baking operations may be increased.

A further object of this invention is to provide a bread slicing machine in which the cutting blades are disposed at such an angle to the line of motion of the loaf of bread that the linear rate of blade penetration into the loaf is considerably less than the velocity at which the loaf of bread is moving through the slicing machine thereby permitting a higher throughput velocity. The lower rate of blade penetration enables the overall velocity of the loaves passing through the machine to be increased without deformation of the loaves by the blades.

Still another object of this invention is to provide a bread slicing machine with inclined blades to allow a substantially horizontally moving flight to urge a loaf of bread partially through the slicing blades whereupon another substantially horizontally moving flight will contact the sliced portion of the loaf to urge it the rest of the way past the blades providing positive loaf control at all times.

Many other objects, advantages, and features of invention reside in the construction, combination and arrangement of parts involved in the embodiment of the invention as will be understood from the following description and accompanying drawings wherein:

FIGS. 3, 4 and 5 are vertical longitudinal sections through fragments of the bread slicing machine showing a loaf, drawn in broken lines, being urged through the blades;

FIG. 6 is a vertical section taken across the delivery table showing the gearing of the loaf end guide adjustments;

FIG. 7 is a section taken on line 7—7 of FIG. 1 with portions of the housing broken away; and FIG. 8 is a plan view, partly in section, of the delivery table.

Figure 1:
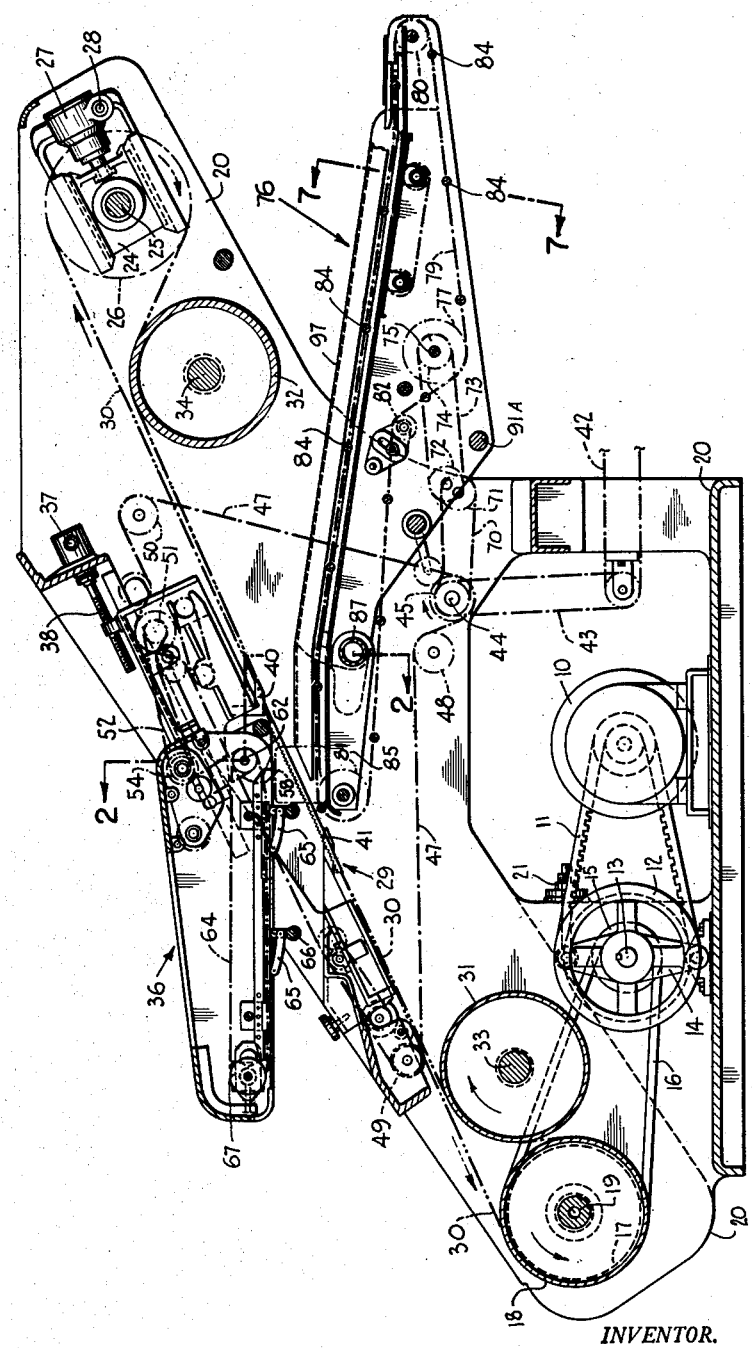
FIG. 1 is a vertical section taken longitudinally through the bread slicing machine with the paths of the blades, the flight supporting chains, and drive chains shown in broken lines.

Referring to the drawings in detail, the bread slicing machine is constructed as follows. As shown in FIG. 1, a motor 10 drives the belt 11 which turns the pulley 12 mounted on shaft 13. Shaft 13 is rotatably mounted in the element 14 which is pivotally connected by its lower end to the frame 20 of the bread slicing machine. Shaft 13 also carries pulley 15 which drives the belt 16 which, in turn, drives the pulley 17 mounted on shaft 19. Shaft 19 is rotatably journaled in the sides of the frame 20 and has mounted upon it the drive drum 18. Rod 21 has one end attached to the top of element 14 while the other end is adjustably secured to the frame 20 so that rod 21 may be adjusted to pivot element 14 about its lower end to properly regulate the tension in belt 16. The motor 10 may be moved on the frame 20 to adjust the tension of belt 11.

On each side of the top of frame 20, there is slidably mounted a bearing block 24 in which a shaft 25 is rotatably mounted to carry the blade support drum 26. Two retracting mechanisms 27 are connected by means of a shaft 28 which may be turned to slide both the blocks 24 in relation to the frame 20 to move the drum 26 away from the drum 18 and thus adjust the tension of the saw blades 29 whose paths are indicated by the broken lines 30. The two deflecting idler drums 31 and 32 are rotatably secured by means of the shafts 33 and 34. The blades 29 each form a distorted figure 8 passing under the drive drum 18 and over the deflecting roller 31 to pass over, around, and down under the support roller 26 to pass over the deflecting roller 32 and then extend back to the top of the drive roller 18. If tangents to the tops of drums 18 and 26 are in a first plane, tangents to the tops of drums 31 and 32 will be in another plane disposed parallel to and slightly below the first plane. Since one run of each blade 29 extends from the top of the deflecting drum 31 to the top of the support drum 26 and the other run of each blade extends from the top of the drive drum 18 to the top of the deflecting drum 32, the central portions of each blade will pass each other inclined at a slight angle with one central portion moving upward and the other central portion moving downward. Since the blades 29 must lie flat against the drums when they contact them, each blade receives a 180 degree twist between drum 31 and drum 26 as well as between drum 32 and drum 18. Therefore, as seen in FIG. 1, if the cutting edge of a blade 29 were disposed towards the viewer as it passed about drum 18 and drum 31, the cutting edge of the blade 29 would be disposed away from the viewer as the blade passed about drum 32 and drum 26.

An infeed head, generally designated by the numeral 36, is slidably mounted between the side members of the frame 20 so that it may be positioned by means of the handle 37 and the screw thread 38 a desired distance above an infeed table (not shown in FIG. 1) to accommodate loaves of bread of a given height. The upper blade guides 40 and the lower blade guides 41 are mounted between the side members of the frame members 20. These blade guides 40 and 41 may be laterally adjusted to regulate the width of the slices. Such adjustable blade guides may be of the type shown in Patent No. 2,293,083 issued August 18, 1942, to P. G. Schlemmer or Patent 2,375,231 issued May 8, 1945, to A. A. Kottman. A main drive chain 42 extends from the bread wrapping machine (not shown) to drive the chain 43 which rotates the shaft 44 in a clockwise direction. Shaft 44 carries sprocket 45 which drives the endless chain 47. Chain 47 extends about the the sprockets 45, 48, 49 and 50 which are mounted on the frame 20 and it also engages the sprocket 51 mounted on the infeed head.

Figure 2:
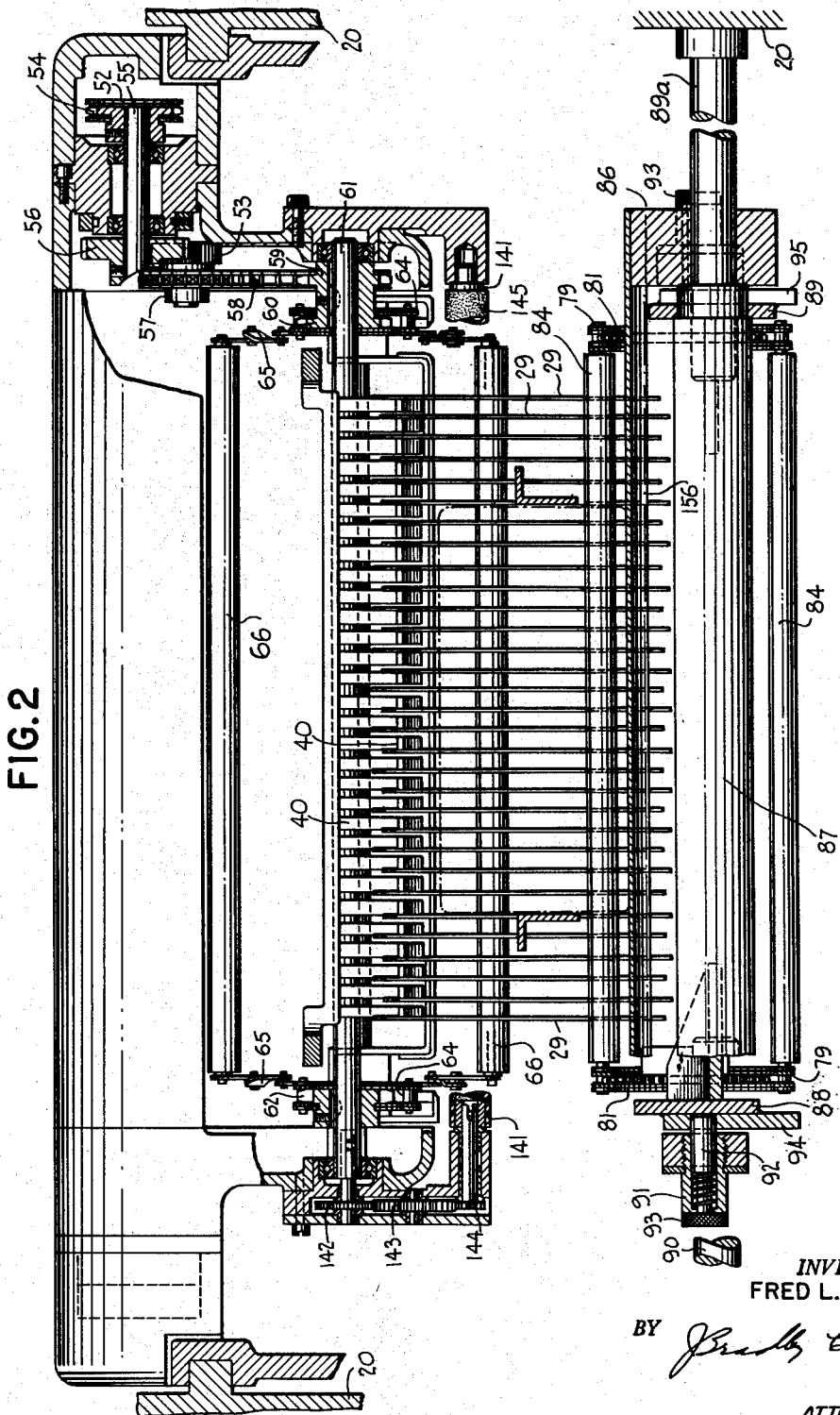
FIG. 2 is a section taken on line 2—2 of FIG. 1.

Referring also to FIG. 2, the endless chain 47 drives the sprocket 51 which, by means of chain 52, drives sprocket 54 mounted on shaft 55 and thereby drives gear 56. Gear 56 drives gear 53 which has mounted on it sprocket 57 driving chain 58 and thereby sprocket 59. Sprocket 59 is formed integrally with sprocket 60 and is mounted on the shaft 61 which carries sprocket 62 on its other end. Therefore, it may be seen that the main drive of the machine from the bread wrapper (not shown) drives the sprockets 60 and 62 mounted on the shaft 61 which is journaled in the infeed head 36. Referring again to FIG. 1, the sprockets 60 and 62 drive the chains 64 about the two sprockets 67 located at the other end of the infeed head 36. The two chains 64 carry the brackets 65 which support the flights 66.

As shown in FIG. 1, shaft 44 also drives chain 70, sprockets 71 and 72 which are connected by a suitable drive means, chain 73 and sprocket 74. Sprocket 74 is mounted on shaft 75 which extends across the delivery table 76 of the slicing machine. As shown in FIG. 7, two sprockets 77 and 78 are mounted on shaft 75. Referring again to FIG. 1, each of these sprockets 77 and 78 drives an endless chain 79 about the sprockets 80 and 81 and the sprockets 82 which may be positioned to adjust tension in the chains 79. The chains 79 carry the flights 84. The forwardly disposed portion of the delivery table of the slicing machine has two side plates 85 and 86 which support the sprockets 81. These side plates 85 and 86 are hinged about the axis of the tubular member 87.

As shown in FIG. 2, two shafts 89a and 90 are fixed in the main frame 20 of the slicing machine and extend into the tubular member 87. The sides of the delivery table, 88 and 89, are fixed to the ends of tubular member 87 so that the shafts 89a and 90, with the tubular member 87, form one main support for the entire delivery table 76 between the main frames 20. Referring to FIG. 1, a second main support for the delivery table 76 is provided by the rod 91A. As shown in FIG. 2, the side member 86 is pivotally secured about shaft 89a. Shaft 90 has the side member 85 pivotally secured about it, but the side member 85 is shown removed with the tubular member 87, the side member 88 and shaft 90 further broken away in section to show a locking plunger assembly 91. Each locking plunger assembly 91 consists of a spring loaded plunger 92 which is fixed to a side plate 85 or 86. Each plunger 92 may be withdrawn by means of a knurled end portion 93 from engagement with an aperture in a small side plate 94 or 95 which is fixed to the side members 88 and 89 respectively of the delivery table 76. Therefore, as seen in FIG. 1, the withdrawal of the plungers 92 allows the forwardly disposed portion of the delivery table 76 to swing downward to facilitate cleaning and servicing of the slicing machine.

FIGS. 7 and 8 show the construction of the delivery table loaf end guides. Two guide members 97 and 98 are pivotally connected at each end to support arms 99 and 100. The arms 99 and 100 are pivotally attached at their centers to the links 101 and 102 which have their other ends pivotally attached to a side member 88 or 89 of the delivery table 76. The outwardly disposed ends of the arms 99 and 100 are pivotally connected to the sliding members 103 and 104. These sliding members, on each side of the delivery table, are engaged by the threaded rods 105 which have a right hand thread on one end and a left hand thread on the other. Therefore, since the links 101 and 102 are one-half the length of the arms 99 and 100, the rotation of a threaded rod 105 will impart a parallel motion to a loaf end guide 97 or 98.

Referring to FIGS. 6 and 7, a hand wheel 106 is mounted on a shaft 107 which extends between the side plates 88 and 89. The ends of the shaft 107 carry the bevel gears 108 and 109 which mesh with the bevel gears 110 and 111 which are mounted on short vertical shafts 112 and 113. The vertical shafts 112 and 113 are mounted in the brackets 120 and 121 and each vertical shaft carries a bevel gear 114 which meshes with a bevel gear 115 mounted on a threaded rod 105. Thus the turning of the hand wheel 106, through the two identical sets of bevel gears, turns both threaded rods 105 on each side of delivery table 76 to position the loaf end guides 97 and 98 simultaneously a given distance from the center of the slicing machine.

Referring further to FIGS. 7 and 8, a hand wheel 129 is mounted on a shaft 122 which is journaled in side plate 88 and whose inwardly disposed end carries a right hand thread. A shaft 123 carries a left hand thread and is journaled in side plate 89 and fixed to shaft 122 by means of a sleeve 124. Shafts 125 and 177 are likewise journaled in side plates 88 and 89 and joined by a sleeve 126. Shaft 125 carries a right hand thread and shaft 177 a left hand thread. A sprocket 128 is mounted on shaft 125 and a sprocket 134 is mounted on shaft 122. Sprockets 128 and 134 are of the same size and are connected by chain 127 to rotate simultaneously. A thin bottom plate 130 extends over the surface of the delivery table 76 between the chains 79. The two rearwardly disposed corners of the bottom plate 130 are cut away to form the rectangular cutouts 133. As shown in FIG. 7, the two auxiliary bottom plates 131 and 132 are supported by the pairs of brackets 135 and 136 which are engaged by the threaded portions of the shafts 122, 123, 125 and 127. Thus it may be seen that the rotation of hand wheel 129 will simultaneously position the auxiliary bottom plates 131 and 132 so that slices of the loaf of bread disposed between the loaf end guides 97 and 98 will not fall into the rectangular cutouts 133 as the sliced loaf is urged along over the bottom plate 130 by a flight 84. Should a slice of bread or other foreign matter tumble or otherwise become deposited on the delivery table 76 beyond the guides 97 and 98, the flights 84 will sweep this matter along bottom plate 130 until it reaches one of the rectangular apertures 133 whereon it will fall harmlessly to the floor beneath the machine without interferring with its operation. As shown in FIG. 7, the flights 84 on their run over the bottom plate 130 are supported by the chains 79 which rest on top of and are positioned by the chain guide tracks 140.

Referring again to FIG. 2, a top hold down roller 141 is rotatably journaled in the infeed head 36. Shaft 61 which drives the chains 64 by means of the sprockets 60 and 62 has a small extension which carries the spur gear 142. Gear 142 meshes with and drives gear 143 which, in turn, meshes with and drives the pinion gear 144 which is secured to an extension of roller 141 and drives roller 141. Roller 141 is covered with a suitable surface 145 to engage the top of a loaf of bread.

Referring now to FIGS. 3, 4 and 5, this invention operates as follows. An infeed table, of which only the end 150 is shown, is positioned at approximately the same height as the forwardly disposed end of delivery table 76. The infeed table delivers loaves of bread under the infeed head so that a single loaf is engaged and urged along the top surface of the infeed table by each flight 66. As each loaf, generally designated by the numeral 152, is urged along and off the end 150 of the infeed table by a flight 66, its top slidably contacts the loaf guide top plate 154 below which the flights 66 pass.

As each blade 29 passes about the drums 18, 31, 32 and 26 in the manner that has been described, one portion 29a will be moving downward while another portion 29b of the same blade will be moving upward. Since the top surfaces of the drums are not at all in the same plane as has been described, the cutting edges of the portions 29a and 29b of each blade will cross each other approximately in the center of a loaf. Since portion 29a is moving downward and is inclined at a lesser angle than portion 19b, it will first contact the loaf 152 to urge it downward and prevent the loaf 152 from jumping as it makes first contact with the blades. A short moment later the front edge of each loaf 152 will contact the upward running portion 29b of each blade. However, any upward force exerted on the loaf 152 by the upward running portion 29b of each blade will be counteracted by the downward force exerted on the loaf by the downward running portion 29a of each blade. As shown in FIG. 3, each flight 66 urges a loaf of bread from the infeed table onto plate 155 of the delivery table 76. The front portion of delivery table 76, which folds downward in a manner which has been described, has extending between the side plates 85 and 86 the thin bottom plate 155 with a downwardly curving leading edge 156. As each loaf moves onto plate 155 and out from under the top plate 154, it is held down by the rotating roller 141.

Each flight 66 is rotatably secured at each end by a bracket 65 comprising an arm 157 which is pivotally attached to the chain 64 and a retracting link 158 which is pivotally attached between a part of chain 64 disposed behind each link 157 and an intermediate portion of link 157. Since each chain 64 rides on the underside of a guide track 159 which curves slightly upward at its forwardly disposed end, as each chain 64 moves upward along guide track 159 and then curves about each sprocket 62, the flight support arms 157 will be retracted as each arm 157 moves upward along the curved end of track 159 and then about sprocket 62. This retraction, which is shown successively in FIGS. 3, 4 and 5, enables the flights 66 to pass between top plate 154 and roller 141 and allows the sprocket 62 and thus the entire infeed head 36 to be located closer to the blades 29.

As each loaf 152 is urged into and partially past the blades 29 by a flight 66, the chains 79 carry a flight 84 into contact with the lower sliced portion of each loaf 152. As shown in FIG. 4, flight 84 urges the loaf 152 on through the blades as flight 66 retracts upward to pass between plate 154 and roller 141. As may be seen in FIG. 5, the last portion of a blade 29 to contact a loaf 152 is the downwardly moving portion 29a. Since the last portion of each blade 29 which contacts a loaf 152 is moving downward, there is no tendency for the blades to cause the loaf 152 to jump upward. Thus the downwardly moving portion 29a of each blade is both first and last to contact each loaf 152 and the actual cutting of the bread by the blade 29 provides a positive hold down action.

The purpose of inclining the runs of the blades 29 at an angle of 30° to the path of the loaves is to reduce the rate of blade penetration into the loaf for a given loaf speed. If this rate is reduced then the loaf speed may be increased.

A low angle of say 30° of the blade run provides a loaf penetration of one-half the linear (throughput) distance through which the loaf is moved.

Another aspect of the low angle run relates to tooth penetration. The faster the blades themselves are driven the greater is the heat generated from friction and the flexing of the blade. For example, in one particular slicer with blades running at 1800 ft./sec. a rise of 35° F. above ambient temperature was noted. At 1500 ft./sec. this rise was reduced to 25° F. In a slicer constructed in accordance with this invention blade speeds of as low as 400 to 600 ft./sec. have proved feasible. It should be noted that the ambient in a bakery plant is frequently on the order of 100° F. Yet, it has been found that a blade temperature of 135° F. is not permissible with breads having less than 1½% shortening. Furthermore, the life of the blade itself is greatly increased at the lower speeds.

At a given lower blade speed, the reduced rate of blade penetration equivalently reduces the tooth penetration.

The reduced blade penetration equally reduces the tooth penetration into the bread allowing a correspondingly reduced blade speed to provide a predetermined satisfactory tooth penetration rate. Tooth penetration is the distance a tooth penetrates into a loaf for a given distance of blade travel.

Consequently, the lower blade angle permits a higher loaf throughput rate with a correspondingly slower blade speed with its consequent lower temperature rise.

While I have described my invention in the best form known to me, it will nevertheless be understood that this is purely exemplary and that modifications may be made without departing from the spirit and scope of the invention except as it may be more particularly limited in the appended claims wherein I claim:

1. A bread slicing machine comprising, in combination, guide means defining an infeed path comprising a supporting surface for loaves of bread, blade supporting drums mounted on said bread slicing machine, means to drive at least one of said drums, endless slicing blades disposed about said drums having upward and downward runs, said blades disposed at an angle greater than 150 degrees with respect to the line of motion of bread approaching said blades in said infeed path, means for disposing said runs so that said downward runs engage said loaves prior to the engagement of said upward runs with said loaves, to maintain said loaves in contact with said supporting surface upon engagement with said blades, and with the upward and downward runs of each blade crossing within the level of the path of the loaves, means to urge loaves of bread along the infeed path into said blades, a delivery table separate from and independent of said guide means, said table having a surface disposed beyond said blades in line with the infeed path defined by said guide means, and other means to urge loaves of bread along said delivery table.

2. A bread slicing machine comprising, in combination, guide means defining an infeed path for loaves of bread, parallel slicing blades disposed at the end of the infeed path forming an angle with the infeed path, means to individually urge loaves of bread along the infeed path into said blades, a delivery table, separate from said infeed path, having a surface disposed beyond said blades, said surface having a portion adjacent said blades substantially uniplanar with said infeed path in its entirety and in line with the infeed path defined by said guide means, and other means to contact each loaf while the loaf is being urged past said blades by said means to urge said loaf along the infeed path, said other means to contact each loaf further urging each loaf past said blades along said delivery table.

3. A bread slicing machine comprising, in combination, guide means defining an infeed path for loaves of bread, blade supporting drums mounted on said bread slicing machine, means to drive at least one of said drums, endless slicing blades disposed about said drums with upward and downward runs of each blade, said blades disposed at an angle greater than 150 degrees with respect to the line of motion of bread approaching said blades in said infeed path, with the downward run of each blade being inclined at a slightly lesser angle to the infeed path than the upward run of each blade, and with the upward and downward run of each blade crossing within the path of the loaves, means to individually urge loaves of bread along the infeed path into said blades, a delivery table, separate from said guide means, having a surface disposed beyond said blades in line with the infeed path defined by said guide means, means to contact each loaf while the loaf is being urged past said blades by said means to urge said loaf along the infeed path, said means to contact each loaf further urging each loaf past said blades and along said delivery table.

4. A bread slicing machine comprising, in combination, an infeed table, an infeed head, said infeed head having a first spaced pair of endless chains disposed over said infeed table, and flights disposed between and attached to said endless chains to each contact a loaf of bread on said infeed table, parallel slicing blades disposed at an angle with said infeed table at the end of said infeed table, a delivery table having a surface disposed beyond said blades in line with said infeed table, a second pair of endless chains disposed in spaced relation about said delivery table, flights attached to said second pair of endless chains, means driving said first and second pairs of endless chains so that said flights attached to said first set of endless chains each urge a loaf of bread into said blades whereupon one of said flights attached to said second set of endless chains engages a partially sliced portion of each loaf of bread and urges the loaf past said blades and along said delivery table.

5. In a bread slicing machine, a bread infeed, a bread slicer, a bread outfeed separate from and spaced from said infeed, said slicer disposed in the path between said infeed and said outfeed at an acute angle to said outfeed, a first positive drive for driving bread along said infeed and into and partially through said slicer, and a second positive drive for driving said bread out of said slicer and along said outfeed and means, operatively associated with said drives, whereby said first positive drive maintains engagement with said bread until after said second positive drive engages said bread.

6. In a bread slicing machine, a slicer, a first continuous drive means, a flight mounted on said first continuous drive means for driving bread into engagement with said slicer, a second continuous drive means, an element mounted on said second continuous drive means for driving said bread, and means, operatively associated with said flight and said element, whereby said flight maintains engagement with said bread until after said element engages said bread.

References Cited in the file of this patent
UNITED STATES PATENTS

| | | |
|---|---|---|
| 1,910,096 | Egan et al. | May 23, 1933 |
| 2,185,835 | Criner | Jan. 2, 1940 |
| 2,293,053 | Ferenci | Aug. 18, 1942 |
| 2,293,083 | Schlemmer | Aug. 18, 1942 |
| 2,424,659 | Hartman | July 29, 1947 |
| 2,515,749 | Wallace et al. | July 18, 1950 |
| 2,858,863 | Lorenzen | Nov. 4, 1958 |
| 2,934,119 | Hoppe et al. | Apr. 26, 1960 |